s(12) United States Patent
McCormack et al.

(10) Patent No.: US 7,570,629 B1
(45) Date of Patent: Aug. 4, 2009

(54) DISTRIBUTION OF PACKETS TO MULTIPLE ADDRESSES

(75) Inventors: Tony McCormack, Galway (IE); Neil O'Connor, Galway (IE)

(73) Assignee: Nortel Network Limited, St. Laurent, Quebec (CA)

( * ) Notice: Subject to any disclaimer, the term of this patent is extended or adjusted under 35 U.S.C. 154(b) by 652 days.

(21) Appl. No.: 10/872,579

(22) Filed: Jun. 21, 2004

(51) Int. Cl.
H04L 12/66 (2006.01)
H04L 12/28 (2006.01)

(52) U.S. Cl. .................. 370/352; 370/389; 370/390
(58) Field of Classification Search ............ 370/389, 370/408, 352, 353, 354, 356
See application file for complete search history.

(56) References Cited

U.S. PATENT DOCUMENTS

| | | | | |
|---|---|---|---|---|
| 5,937,169 | A * | 8/1999 | Connery et al. | 709/250 |
| 6,678,246 | B1 * | 1/2004 | Smyth | 370/230 |
| 6,751,219 | B1 * | 6/2004 | Lipp et al. | 370/390 |
| 6,993,024 | B1 * | 1/2006 | McDermott et al. | 370/390 |
| 7,362,753 | B2 * | 4/2008 | Irish et al. | 370/389 |
| 2003/0012190 | A1 * | 1/2003 | Kaku et al. | 370/389 |
| 2003/0152078 | A1 * | 8/2003 | Henderson et al. | 370/389 |
| 2004/0240446 | A1 * | 12/2004 | Compton | 370/389 |

* cited by examiner

*Primary Examiner*—Hassan Kizou
*Assistant Examiner*—Brandon Renner
(74) *Attorney, Agent, or Firm*—Barnes & Thornburg LLP

(57) ABSTRACT

A method is provided for distributing packets to multiple addressees over a network. A template packet is generated by the usual routing stack for each addressee to include the routing information necessary to send a packet to that addressee. From this template packet a template is formed and stored for each addressee. The data stream to be transmitted is formed into a stream of data packet payloads. Rather than sending this stream through the routing stack for each addressee, the template for each addressee is applied to each data packet payload to thereby generate a plurality of packets from every data packet payload each addressed to a different addressee. This enables multicast-like efficiencies to be achieved without using multicast protocols which are frequently disabled or unavailable on networks, and avoids the processor-intensive alternative of sending each data packet through the IP stack once for each addressee.

4 Claims, 5 Drawing Sheets

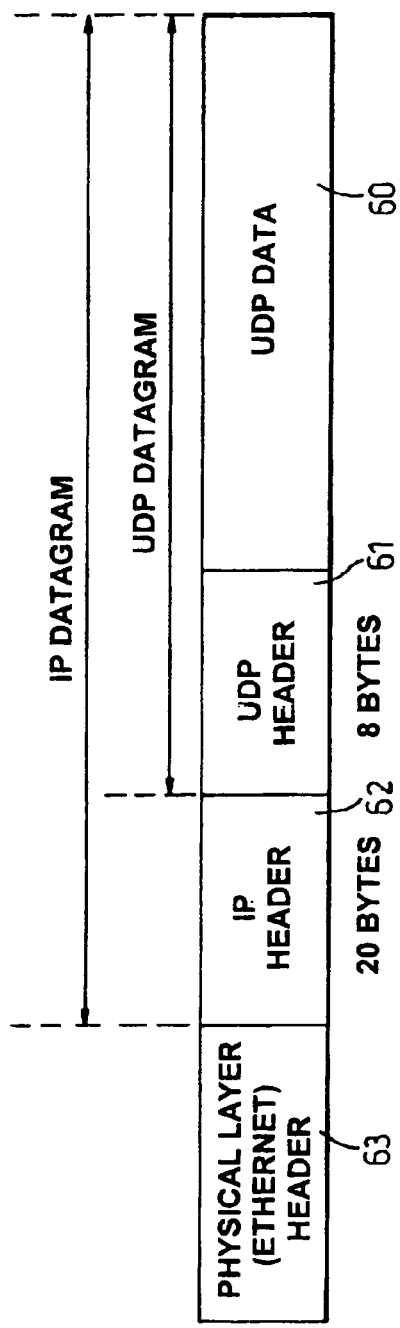
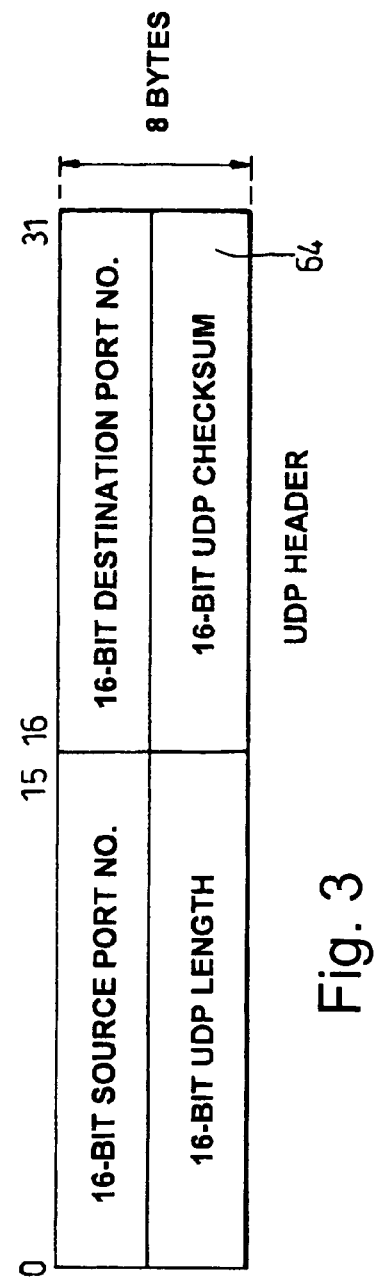
Fig. 2
Fig. 3

DISTRIBUTION OF PACKETS TO MULTIPLE ADDRESSES

FIELD OF THE INVENTION

This invention relates to the distribution of packets to multiple addressees.

BACKGROUND OF THE INVENTION

With the proliferation of distributed computing technologies such as GRID, Jini, JXTA and Web Services, there is an increasing need for distributed clients to update one another with rapidly changing information. In packet-based networks this requires that packets are sent to multiple addressees. Many other scenarios also require the distribution of packets to multiple addressees (such as for example the one-to-many distribution of voice-over-IP telephony packets from a conferencing server to multiple recipients of the conference voice stream).

Packets sent to a number of addresses over packet-based networks can be sent individually to multiple addressees (each stream being a unicast stream), as a multicast stream in which packets are replicated and distributed to group members at router level, or as a broadcast stream in which every node on the network receives the packets.

Broadcast and multicast are disabled by default in many routers in order to reduce network traffic due to abuse of multicast and broadcast facilities. This means that in cases where packets need to be sent to multiple addressees the only viable method of doing so is to implement a multiple unicast session. Each packet is replicated by the sender and processed by the sender's routing stack once for each address.

A difficulty with this method of operation is that the processing requirements are magnified at the sender side. When there are many addressees the amount of processing required in the routing stack of the sender can be prohibitive or can adversely affect other tasks in the sender's computer.

Such problems can be exacerbated in devices with reduced processing power. Many mobile devices (such as notebook computers, personal digital assistants (PDAs), mobile phones, media players and cameras) are provided with network capabilities but for cost and size reasons have reduced processing abilities relative to standard PCs. Nevertheless it is increasingly the case that such devices will form part of dynamically created network groups—for example using a PDA to access printers, scanners, servers, etc. provided on a network. Such network groups may require packets to be distributed to all group members in a multicast or multiple unicast manner, and this may prove unduly onerous for the processing abilities of such a mobile device.

Devices which process voice data for telephone calls require the processing time to be minimised to reduce the loss of voice quality associated with increased processing times.

SUMMARY OF THE INVENTION

The invention has as an object the provision of an advantageous method of distributing packets to multiple addressees.

The invention provides a method of distributing packets to multiple addressees. This method includes the steps of:
  a) generating, for each addressee, a template packet which includes routing information for that addressee;
  b) using that routing information to form a template for each addressee;
  c) storing the template for each addressee in memory;
  d) forming a data stream into a stream of packets;
  e) storing each such packet; and
  f) applying the template for each addressee to each packet to thereby generate a number of addressed packets, each addressed to a different addressee, from every data packet payload. These individually addressed packets are thus generated without passing the data through a routing stack every time.

The known approach for distributing packets to multiple addressees when multicast is not enabled requires that the data stream is packetised and each packet is sent through the routing stack once for every addressee. In contrast, the approach of the present invention allows each addressee to have a template in memory which contains the necessary routing information, and for this template to be applied to the data payload of each packet in the data stream, thereby dramatically reducing the processing overheads.

Preferably, step a) is carried out in a first processor which includes a routing stack and step f) is carried out in a second processor which does not include a routing stack.

The invention further provides a method of distributing packets to multiple addressees comprising the steps of:
  a) determining if multicast is enabled on a network of which said addressees are members;
  b) if multicast is enabled on said network, distributing said packets as multicast packets;
  c) if multicast is not enabled on said network:
    i) generating, for each addressee, a template packet which includes routing information for that addressee;
    ii) using the routing information from the template packet to form a template for each addressee;
    iii) maintaining, for each addressee, said template in a memory area;
    iv) forming a data stream into a stream of data packet payloads;
    v) storing each data packet payload in a memory accessible to a packet processor; and
    vi) applying the template for each addressee to each data packet payload to thereby generate a plurality of packets from every data packet payload each addressed to a different addressee without passing the data packet payload through a routing stack.

In another aspect the invention provides a computer program which can be used in a networked device to distribute packets to multiple addressees by:
  a) generating, for each addressee, a template packet which includes routing information for that addressee;
  b) using the routing information from the template packet to form a template for each addressee;
  c) maintaining, for each addressee, said template in a memory area;
  d) forming a data stream into a stream of data packet payloads;
  e) storing each data packet payload in a memory accessible to a packet processor; and
  f) applying the template for each addressee to each data packet payload to thereby generate a plurality of packets from every data packet payload each addressed to a different addressee without passing the data packet payload through a routing stack.

The invention also provides an apparatus for distributing packets to multiple addressees comprising:
  a) a processor for generating, for each addressee, a template packet which includes routing information for that addressee;

b) a template generator for forming a template for each addressee using the routing information from the template packet;

c) a memory area for maintaining said template for each addressee;

d) means for forming a data stream into a stream of data packet payloads;

e) a memory for storing each data packet payload; and f) a packet processor for applying the template for each addressee to each data packet payload to thereby generate a plurality of packets from every data packet payload each addressed to a different addressee without passing the data packet payload through a routing stack.

U.S. Pat. No. 6,678,246 to Smith, which is incorporated herein by reference in its entirety, discloses a method and apparatus for processing a data stream using a template structure which includes routing information for a single addressee only. The apparatus of U.S. Pat. No. 6,678,246 can be modified in accordance with the present invention to provide the same basic functionality in respect of each addressee in a group, thereby enabling the data stream to be sent as a multiple unicast stream without using the routing stack for each addressee on every packet.

U.S. Pat. No. 6,678,246 is concerned with the provision of a one-to-one data stream. The present invention, on the other hand, accomplishes a one-to-many transmission of data by implementing a multiple unicast procedure in which each addressee has a template containing the routing information for that addressee. When a data stream is formed into data packet payloads, each data packet payload is sent to a packet processor which stores that payload temporarily in memory and then applies the template for each addressee to that payload, to generate a separate packet for each addressee. The packets generated from a given data packet payload are sent on to the network, and then the next data packet payload is processed in the same way.

BRIEF DESCRIPTION OF THE DRAWINGS

For a better understanding of the invention, and to show by way of example how it may be carried into effect, embodiments will now be described with reference to the accompanying drawings, in which:

FIG. 2 shows the format of an IP packet;

FIG. 3 shows the format of a UDP header;

DESCRIPTION OF PREFERRED EMBODIMENTS

Figure 1:
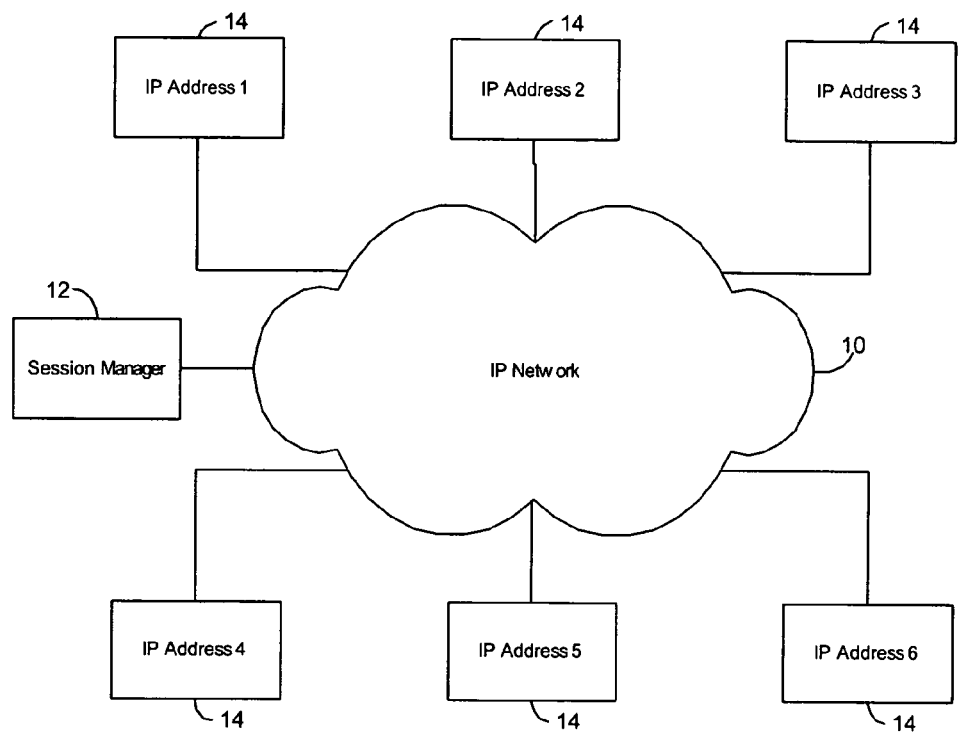
FIG. 1 is a generic architecture of a network having a sender and multiple addressees.

FIG. 1 shows a generic network which allows a number of devices to communicate using packet-based data. An IP network 10 has a number of devices connected to it including a device which for the purposes of an ad hoc communications session is designated as the session manager 12, and a number of addressees 14, each having a unique IP address. The traffic is typically carried over the data network according to TCP/IP or UDP/IP formats; signaling typically being carried by TCP packets and other data by a stream of real time transport protocol (RTP) user datagram protocol (UDP) packets. The data is packaged into data packets which each have a header that carries information to allow the packet to be routed across the data network 10. The data network includes routers which perform routing of the traffic across the data network 30. The above apparatus is known in the art. The data network 10 can be a private IP-based data network or intranet or it can be the public internet.

Figure 4:
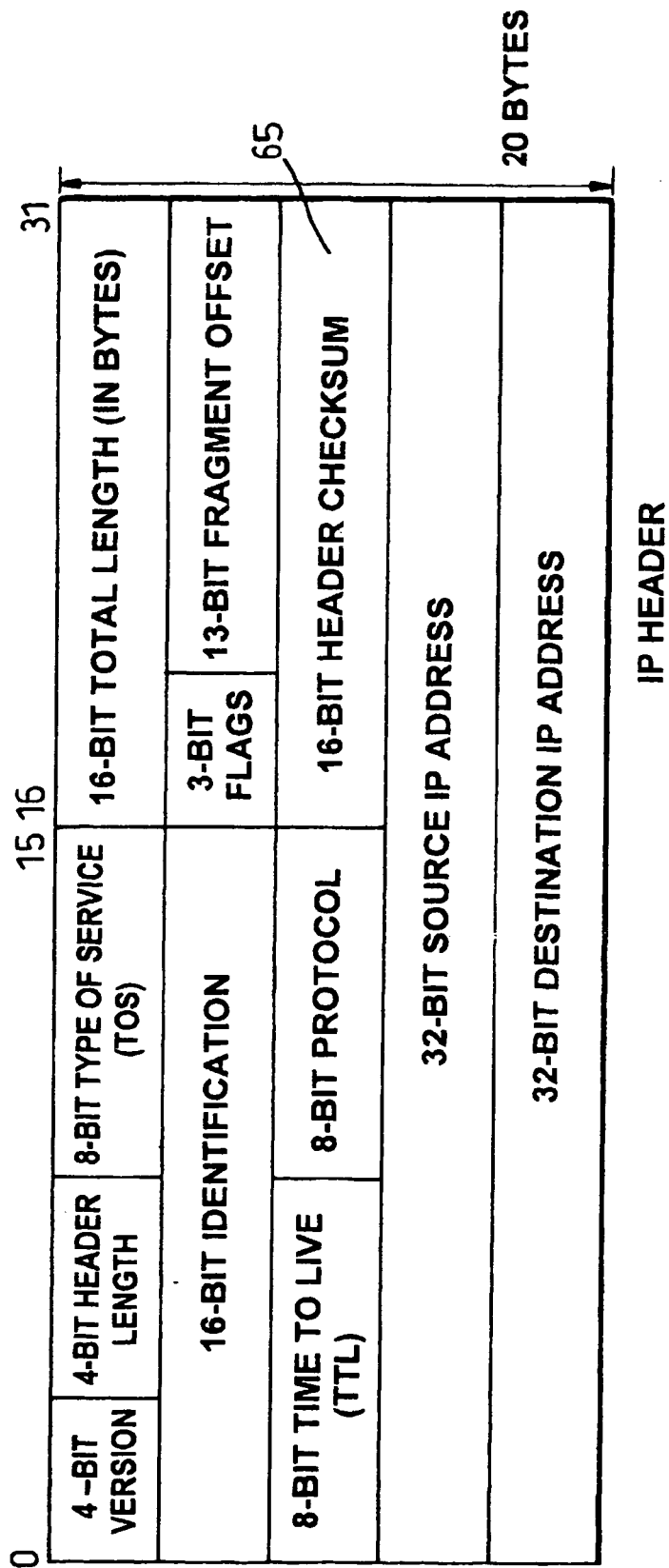
FIG. 4 shows the format of an IP header.

FIG. 2 shows the format of an IP packet or datagram which carries UDP data. This comprises a payload of UDP data 60, a UDP header (8 bytes) 61 and an IP header (20 bytes) 62 and a physical or data link layer header 63. The physical layer is often Ethernet. The length of the payload 60 can vary. FIG. 3 shows the format of the 8 byte UDP header 61 and FIG. 4 shows the format of the 20 byte IP header 62. The 16-bit UDP checksum 64 of the UDP header is calculated according to data present in the UDP Data 60, UDP header 61 and a portion of the IP header 62.

Figure 5:
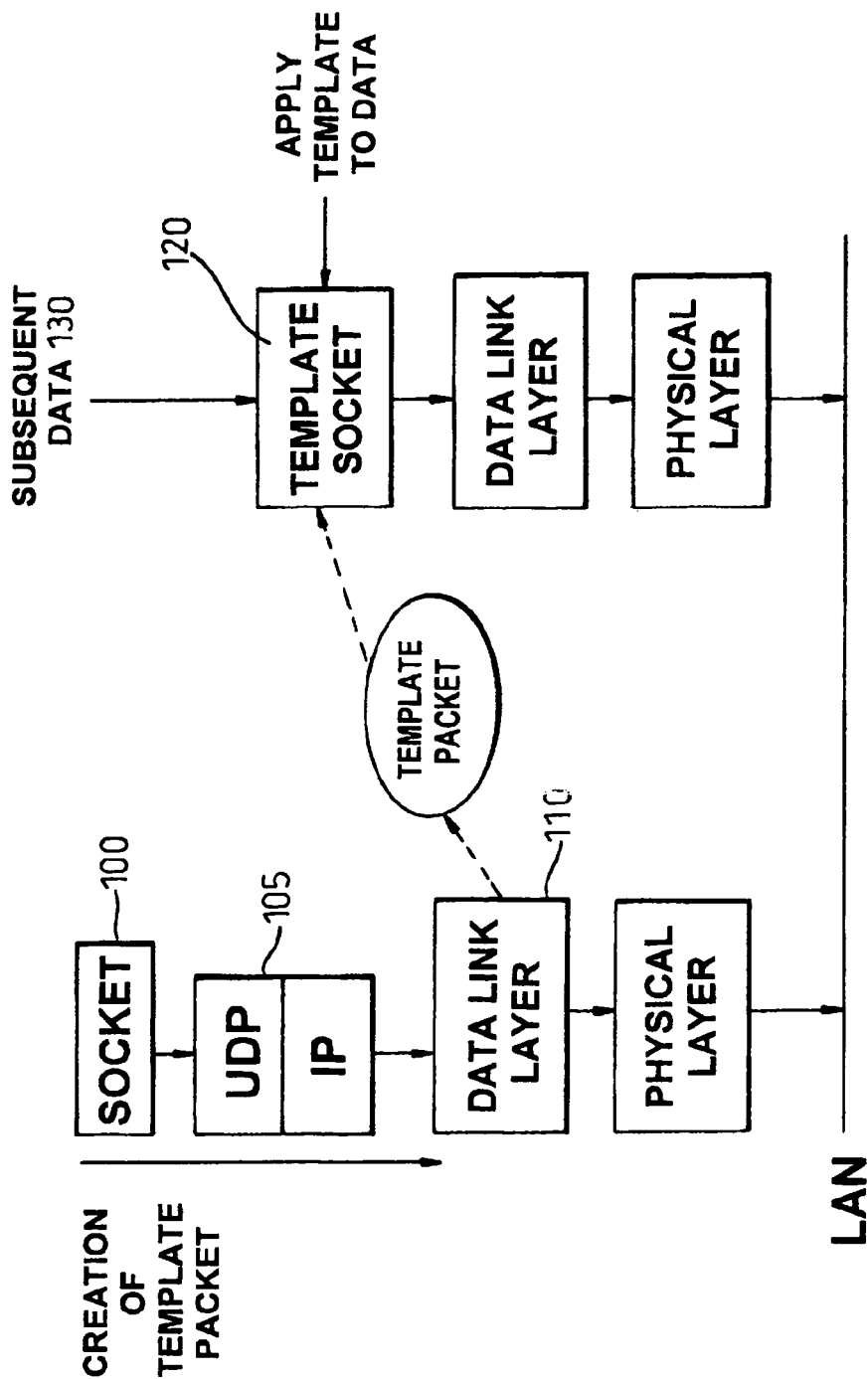
FIG. 5 shows the process of creating a single template packet.

FIG. 5 shows a method in which data packets can be processed for transmission over a data network. It is illustrated with reference to UDP/IP packets, which are used to carry RTP voice data packets of the type used in Voice over IP applications. However, it will be appreciated that the technique can be applied more widely to any type of streamed data packets where the overhead information associated with each packet in the stream remains the same. TCP packets cannot be processed in this manner as they individually require acknowledgement at the IP layer.

The method shown in FIG. 5 is that required to establish the transmission of data packets to a single destination. As will be explained below, this method is carried out, with some modification, for each of the destination addresses 14.

Firstly, a UDP socket 100 is established at the source for sending a data stream from the source to a destination across the data network. The socket is usually established as a result of session setup signalling. A socket is a widely used programming interface for network interfaces in most modern operating systems.

A special template packet is routed through the usual UDP/IP routing stack 105. The payload of the template packet includes a pointer to, i.e. memory address of, a unique template structure stored in memory. This pointer allows the packet to be identified by the Data Link Layer as a template packet.

A preferred form of template structure contains:

1. Unique Identifier—used by the Data Link Layer to quickly determine if this is a template packet.

2. Semaphore—a flag used by the Data Link Layer to indicate to the sender of the template structure that the template is ready for use.

3. Driver Send Function—function specific to the interface through which the packets must be sent to allow direct transmission of subsequent packets, which are not routed through the UDP/IP stack. This is filled in by the Data Link Layer along with the packet template.

4. Driver Send Parameter—parameter that allows identification of an interface to send the packet stream through; used in conjunction with the Driver Send Function. This is required in a system with multiple network interfaces. This is filled in by the Data Link Layer along with the packet template.

5. Template data—the actual data of the created template.

6. Template length—the length of Template data area.

It is important that the Data Link Layer can quickly discern a non-template packet from a template packet so as not to adversely effect normal packet throughput. The device driver (Data Link layer 110) detects the template packet and passes the routed template packet back to the sender. The Data Link layer then copies the header information from the routed packet into the special template structure in memory. Subsequent data 130 is sent via the template socket 120, which uses the information in the template structure, which has just been filled in by the Data Link Layer, to send packets directly to the Data Link Layer.

The IP protocol includes an IP header checksum (65, FIG. 4) which covers the IP header only. The value of the checksum depends, inter alia, on the length of the payload. If the data packets are of the same length then the IP header checksum remains the same for all packets and can be included as part of the template information. This is done by sending a template packet padded to the length which the UDP stream packets will be. If the packets are of differing length, the IP header checksum must be recalculated for each of the packets before they are sent to the data link layer.

The packets are sent directly to the device driver (data link layer) for transmission over the data network, bypassing the UDP/IP stack 105. Only the UDP checksum must be recalculated and, as described above, the IP checksum if the length varies from packet to packet. Thus, the subsequent data 130 to which the template is applied can be processed more quickly, without requiring the processor to perform the UDP/IP routing for every packet. The overhead section of the first packet can be generated by routing the template packet through the IP stack and the overhead sections of subsequent packets can be generated by applying the template, without routing each of the subsequent packets through the IP stack.

All subsequent packets are processed in this way, bypassing the UDP/IP stack 105. A new template is generated for each addressee identified by the session manager. It is very unlikely that the routing information in any individual template will need to be changed during a session, since the routing of a packet stream tends to be static. However, in a network where routes do change more frequently, it is possible to adapt the technique such that a new template packet is generated every N packets to cope with a route change. The value of N is chosen to be as large as possible for the specific network. In most applications it is rare for the routing to be changed, and the template information would only need to change if the first router 25 on the route across the data network is changed.

Figure 6:
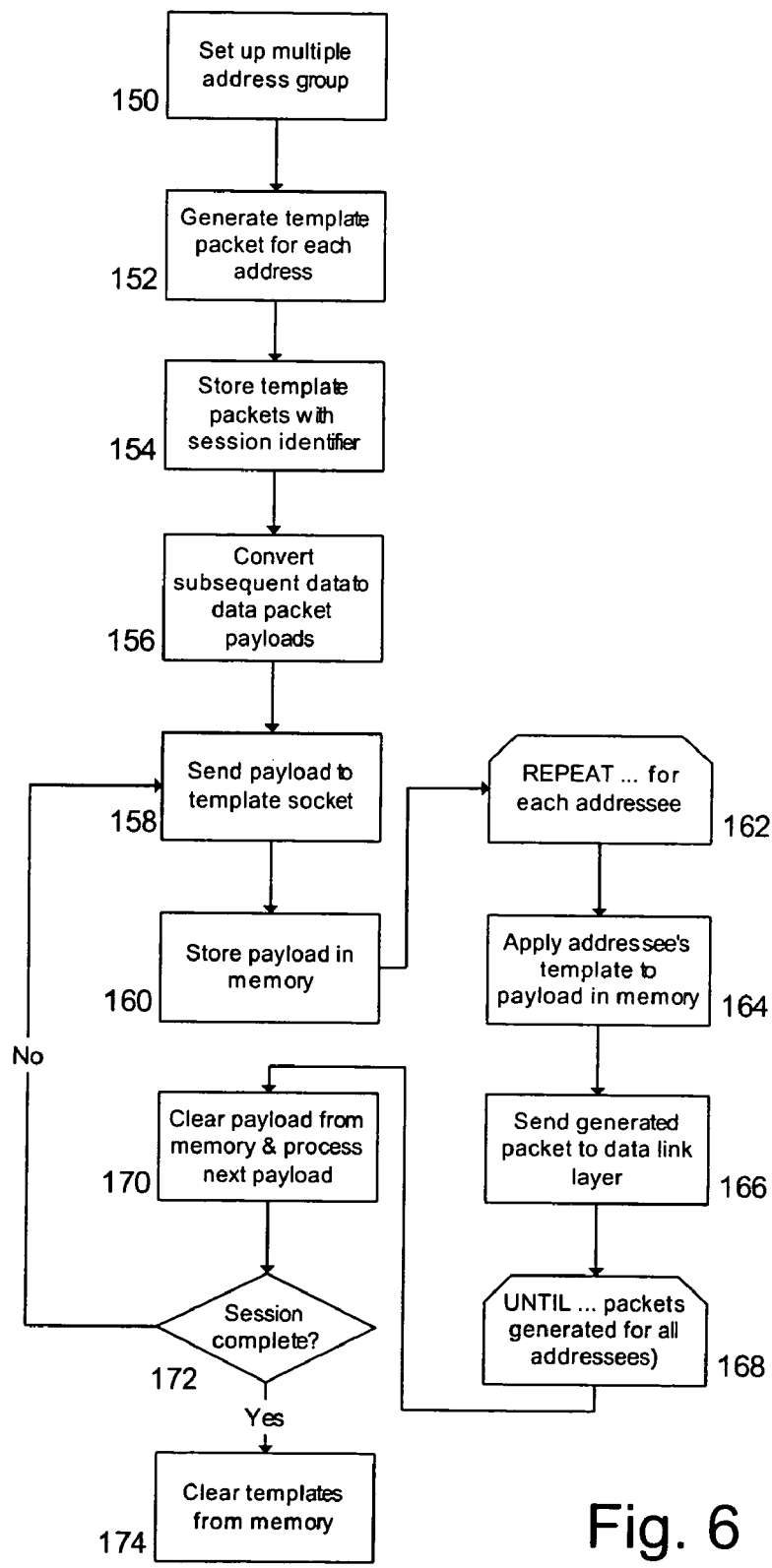
FIG. 6 is a flowchart of a method of distributing packets to multiple addressees.

FIG. 6 is a flowchart illustrating how the method described above is applied to multiple addressees in a multiple unicast session.

In step 150, a multiple address group is set up by the application which is sending the data to the multiple addressees. This could be a teleconferencing application, for example, which identifies each conference participant with its IP address. Or it could be a communications session manager associated with some other application which is responsible for ensuring that a number of devices in an ad hoc network group receive the same set of data.

In step 152, a template packet is generated for each addressee, as previously described. This results in a number of template packets, one for each addressee, being stored, step 154, with a session identifier such that in the event of there being multiple sessions simultaneously in progress, the data for a particular session will be sent to the correct group of addressees.

Subsequent data relating to the communications session is converted to packet payloads, step 156, and each such data packet sent to the template socket, step 158. In step 160, the payload is temporarily stored in memory to enable it to be reused for multiple addressees. The process then proceeds to a loop beginning in step 162, with this lop being reiterated for each addressee. In step 164, the first addressee's template is retrieved and applied to the payload stored in memory, resulting in the generation of an addressed packet including the necessary routing information to reach that addressee. That packet is then forwarded to the data link layer, step 166, and the data link layer sends the packet out over the network to the first addressee. The process then checks whether all addressees have been sent the packet payload stored in memory, and if not the process loops back, from step 168 to step 162, to repeat the application of the template for the next addressee to the stored packet payload. When all of the addressees have been sent a packet with that payload, the payload is cleared from memory and the next payload is awaited, step 170.

If notification is received that the session is complete, then all of the templates are cleared from memory, step 172. Otherwise, when the next data packet payload is received, the process loops back to step 158 as shown and that packet payload is used with the same set of templates to generate a further set of packets including the necessary routing information.

The following is a pseudo code description of the process of creating a template in an UDP/IP environment. There are two parts: the Socket side and the Data Link Layer side.

Socket Side:

1. Create the Socket as normal for transmitting data to destination.

2. Allocate memory space for the template structure described above and initialize the unique identifier.

3. Create the semaphore which will indicate when the template has been created by the Link Layer and fill the value into the template structure.

4. Call the write function for the socket with the data being the pointer to the template structure. If the data stream for which you are creating the template for is of fixed length, also write the socket with the enough pad data to make the socket write the correct length, e.g. if every packet is X bytes long, write the socket with the pointer value and (X—size of pointer) pad bytes. The value of the pad bytes is not important. This only works if the packet length is less than the UDP maximum packet size.

5. Wait on the semaphore.

6. When the Link Layer gives the semaphore, the remaining fields of the template structure have been filled in by the Link Layer and the template is now ready for use.

7. All further data packets are sent directly to the Link Layer (110) by using the driver send function from the template structure.

Link Layer Side:

1. Check the packet to see if it is a template packet by de-referencing the pointer value returned by assuming the first (size of pointer) bytes is a template structure pointer. Range check the pointer to make sure it is in a valid memory range before de-referencing. Check the Unique Identifier to determine is it a valid template packet.

2. If it is not a template packet, transmit as normal.

3. If it is a template packet, fill in the template structure with the packet header contents and length. Fill in the driver send function and parameter fields with the relevant details for this device driver (link layer).

4. Give the semaphore to tell the socket layer that the template structure is ready for use.

5. Release any memory associated with the data packet, all relevant data is now stored in the template structure.

It is possible to obtain further benefits by using the templating mechanism to offload UDP Stream packet processing from the main CPU to a lower cost co-processor optimized to the job of applying the template to the data stream. This architecture comprises two processors:

a first processor which is optimised to handle processing of RTP packets. This processor can be a field programmable gate array (FPGA) or a micro-RISC processor which are often provided as co-processors to Embedded System Controllers, such as the Power QUICC from Motorola™, or other device.

a second processor to handle processing of all other packets, i.e. non-RTP packets, and the template packets and running other application code. This second processor can be a CPU such as an Intel™ 486 or Pentium™ processor.

A reduced instruction set (RISC) processor or FPGA device has a reduced functionality compared with a full CPU, but has a significantly lower cost compared with the full CPU.

The Packet Processor can be as complex or as simple as the application requires. For some implementations an FPGA with some help from the main CPU will suffice, while in others the Packet Processor may be a full blown CPU in it's own right. The differences will be due to the number of packets per second required to be handled by the system and how much extra work the main CPU must perform.

What is claimed is:

1. A method of distributing packets to multiple addressees comprising the steps of:
   a) generating, for each addressee, a template packet which includes routing information for that addressee;
   b) using the routing information from the template packet to form a template for each addressee;
   c) maintaining, for each addressee, said template in a memory area;
   d) forming a data stream into a stream of data packet payloads;
   e) storing each data packet payload in a memory accessible to a packet processor; and
   f) applying the template for each addressee to each data packet payload to thereby generate a plurality of packets from every data packet payload each addressed to a different addressee without passing the data packet payload through a routing stack.

2. A method as claimed in claim 1, wherein step a) is carried out in a first processor which includes a routing stack and step f) is carried out in a second processor which does not include a routing stack.

3. A method of distributing packets to multiple addressees comprising the steps of:
   a) determining if multicast is enabled on a network of which said addressees are members;
   b) if multicast is enabled on said network, distributing said packets as multicast packets;
   c) if multicast is not enabled on said network:
      i) generating, for each addressee, a template packet which includes routing information for that addressee;
      ii) using the routing information from the template packet to form a template for each addressee;
      iii) maintaining, for each addressee, said template in a memory area;
      iv) forming a data stream into a stream of data packet payloads;
      v) storing each data packet payload in a memory accessible to a packet processor; and
      vi) applying the template for each addressee to each data packet payload to thereby generate a plurality of packets from every data packet payload each addressed to a different addressee without passing the data packet payload through a routing stack.

4. An apparatus for distributing packets to multiple addressees comprising:
   a) a processor for generating, for each addressee, a template packet which includes routing information for that addressee;
   b) a template generator for forming a template for each addressee using the routing information from the template packet;
   c) a memory area for maintaining said template for each addressee;
   d) means for forming a data stream into a stream of data packet payloads;
   e) a memory for storing each data packet payload; and
   f) a packet processor for applying the template for each addressee to each data packet payload to thereby generate a plurality of packets from every data packet payload each addressed to a different addressee without passing the data packet payload through a routing stack.

* * * * *